(12) United States Patent
Matsuo et al.

(10) Patent No.: US 11,329,520 B2
(45) Date of Patent: May 10, 2022

(54) POWER TRANSMISSION DEVICE, POWER RECEPTION DEVICE, WIRELESS POWER TRANSMISSION SYSTEM, AND METHOD FOR DRIVING POWER TRANSMISSION DEVICE

(71) Applicant: PANASONIC INTELLECTUAL PROPERTY MANAGEMENT CO., LTD., Osaka (JP)

(72) Inventors: Hiroyuki Matsuo, Osaka (JP); Keisuke Fujimoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/161,413

(22) Filed: Jan. 28, 2021

(65) Prior Publication Data
US 2021/0152032 A1 May 20, 2021

Related U.S. Application Data

(63) Continuation of application No. PCT/JP2019/028604, filed on Jul. 22, 2019.

(30) Foreign Application Priority Data

Jul. 31, 2018 (JP) .............................. JP2018-143147

(51) Int. Cl.
*H02J 50/60* (2016.01)
*H02J 50/10* (2016.01)
(Continued)

(52) U.S. Cl.
CPC ............ *H02J 50/60* (2016.02); *B60L 53/124* (2019.02); *H02J 50/10* (2016.02); *H02J 50/70* (2016.02); *H02J 50/80* (2016.02); *H02J 50/90* (2016.02)

(58) Field of Classification Search
CPC ......... B60L 53/124; H02J 50/10; H02J 50/12; H02J 50/60; H02J 50/70; H02J 50/80; H02J 50/90; H02J 2310/48
(Continued)

(56) References Cited

U.S. PATENT DOCUMENTS 11,121,581 B2 * 9/2021 Czainski ................. H01F 38/14
2014/0239735 A1 * 8/2014 Abe ...................... B60L 53/124
307/104
(Continued)

FOREIGN PATENT DOCUMENTS

JP 2013-110949 A 6/2013
JP 2014-023296 A 2/2014
(Continued)

OTHER PUBLICATIONS

International Search Report and Written Opinion issued in International Patent Application No. PCT/JP2019/028604, dated Sep. 10, 2019; with partial English translation.

*Primary Examiner* — Levi Gannon
(74) *Attorney, Agent, or Firm* — McDermott Will & Emery LLP

(57) ABSTRACT

A power transmission device includes a power transmission coil, a magnetically shielded space created by a power transmission-side cancel coil arranged outside the power transmission coil, a moving member configured to move a metal foreign substance, and a moving mechanism configured to move a part or all of an upper surface of the moving member from an area outside the magnetically shielded space into the magnetically shielded space.

14 Claims, 17 Drawing Sheets

(51) Int. Cl.
  *H02J 50/80* (2016.01)
  *H02J 50/90* (2016.01)
  *H02J 50/70* (2016.01)
  *B60L 53/124* (2019.01)

(58) Field of Classification Search
  USPC .......................................................... 307/104
  See application file for complete search history.

(56) References Cited

U.S. PATENT DOCUMENTS

| | | | |
|---|---|---|---|
| 2015/0123609 A1* | 5/2015 | Niizuma | B60L 53/122 |
| | | | 320/108 |
| 2015/0128362 A1* | 5/2015 | Niizuma | H02J 7/0042 |
| | | | 15/3 |
| 2016/0254707 A1 | 9/2016 | Fujiwara et al. | |
| 2017/0043672 A1* | 2/2017 | Araki | H02J 50/60 |
| 2018/0097401 A1* | 4/2018 | Gaskill | H02J 7/0042 |
| 2018/0166929 A1* | 6/2018 | Sawai | G01V 3/10 |
| 2020/0014248 A1 | 1/2020 | Fujiwara et al. | |

FOREIGN PATENT DOCUMENTS

| | | |
|---|---|---|
| JP | 2014-045546 A | 3/2014 |
| JP | 2014-110726 A | 6/2014 |
| JP | 2015-100162 A | 5/2015 |
| JP | 2016-059236 A | 4/2016 |
| WO | 2017/187610 A1 | 11/2017 |

\* cited by examiner

FIG. 9
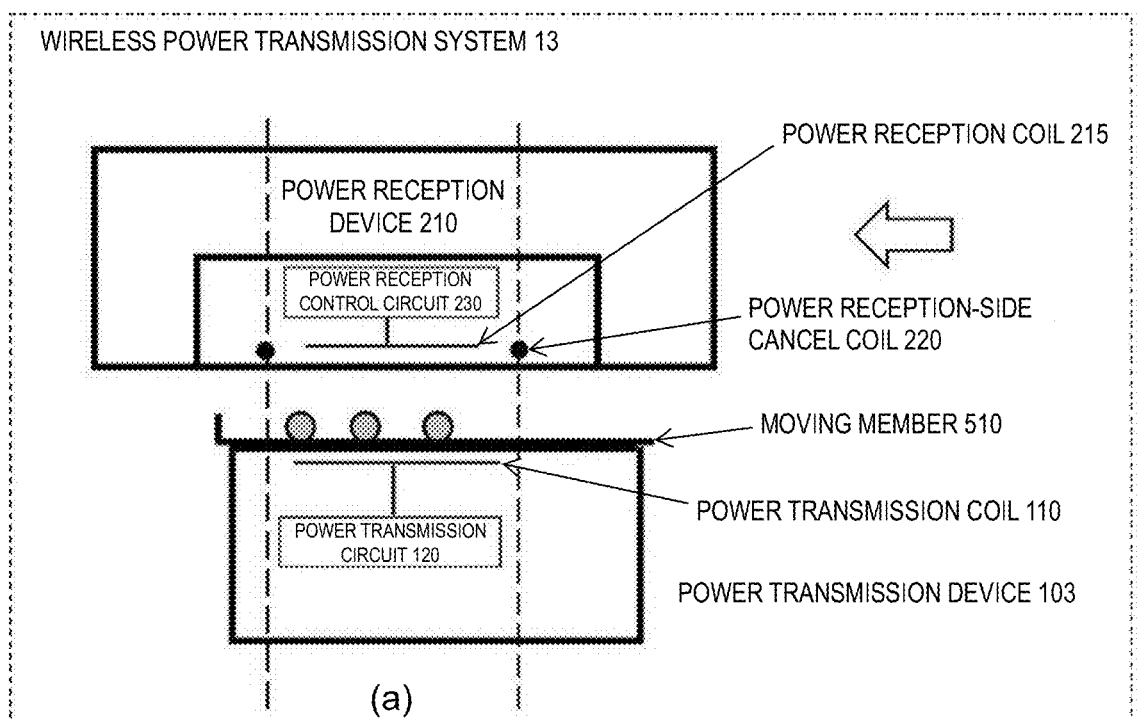
(a)
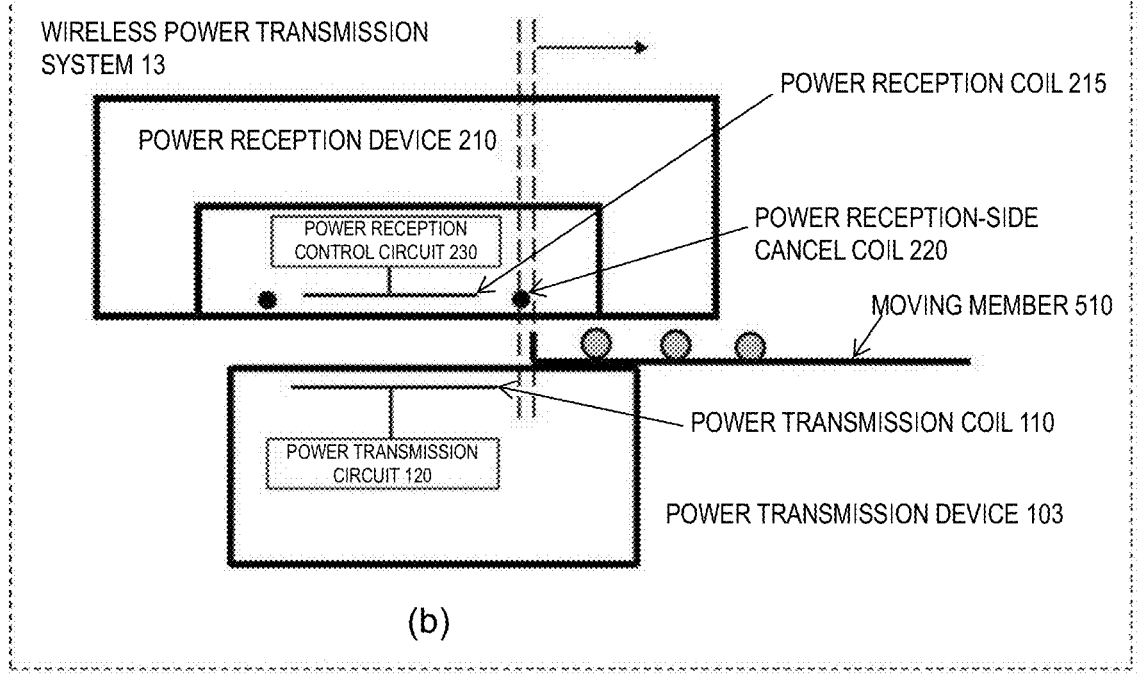
(b)

POWER TRANSMISSION DEVICE, POWER RECEPTION DEVICE, WIRELESS POWER TRANSMISSION SYSTEM, AND METHOD FOR DRIVING POWER TRANSMISSION DEVICE

CROSS-REFERENCE OF RELATED APPLICATIONS

This application is a U.S. Continuation of International Patent Application No. PCT/JP2019/028604, filed on Jul. 22, 2019, which in turn claims the benefit of Japanese Application No. 2018-143147, filed on Jul. 31, 2018, the entire disclosures of which Applications are incorporated by reference herein.

BACKGROUND

1. Technical Field

The present disclosure relates to a power transmission device that transmits power wirelessly, a power reception device that receives power wirelessly, and a wireless power transmission system including both the power transmission device and the power reception device.

2. Description of the Related Art

In a wireless power transmission system, there is a problem that if power is transmitted in a non-contact manner in a state where a metal foreign substance exists between a power transmission coil and a power reception coil, the metal foreign substance generates heat and causes a danger. Therefore, as shown in FIG. 17, in Patent Literature (PTL) 1 (Unexamined Japanese Patent Publication No. 2016-59236), metal foreign substance A on a surface of a power transmission device is dropped from the surface of the power transmission device to a peripheral portion of the power transmission device by a wiper so as to remove metal foreign substance A from an area between a power transmission coil (not shown) and power reception coil (not shown).

SUMMARY

However, in recent years, there has been an increasing demand for non-contact and short-time charging of electric vehicles (EVs), and non-contact and high-output power transmission is desired (for example, 120 kW or more). In such a case, leakage flux due to a power transmission coil becomes large, and a metal foreign substance may generate heat even in a peripheral portion of a power transmission device (outside of the power transmission coil) in which the metal foreign substance is dropped or moved by a wiper.

In order to solve the above problem, a power transmission device according to one aspect of the present disclosure includes a power transmission coil, a magnetically shielded space created by a power transmission-side cancel coil arranged outside the power transmission coil, a moving member configured to move a metal foreign substance, and a moving mechanism configured to move a part or all of an upper surface of the moving member from an area outside the magnetically shielded space into the magnetically shielded space.

The comprehensive or specific aspect described above may be implemented with a system, method, integrated circuit, computer program, or recording medium. Alternatively, the aspect may be implemented with any combination of the system, the device, the method, the integrated circuit, the computer program, and the recording medium.

According to one aspect of the present disclosure, it is possible to suppress heat generation of a metal foreign substance existing in a peripheral portion of the power transmission device even if high-output power transmission is performed in a non-contact manner.

BRIEF DESCRIPTION OF DRAWINGS

FIG. 9 is a schematic side view of a wireless power transmission system according to a third exemplary embodiment of the present disclosure.

DETAILED DESCRIPTION (Findings Underlying the Present Disclosure)

Before explaining exemplary embodiments of the present disclosure, findings underlying the present disclosure will be described.

Figure 1:
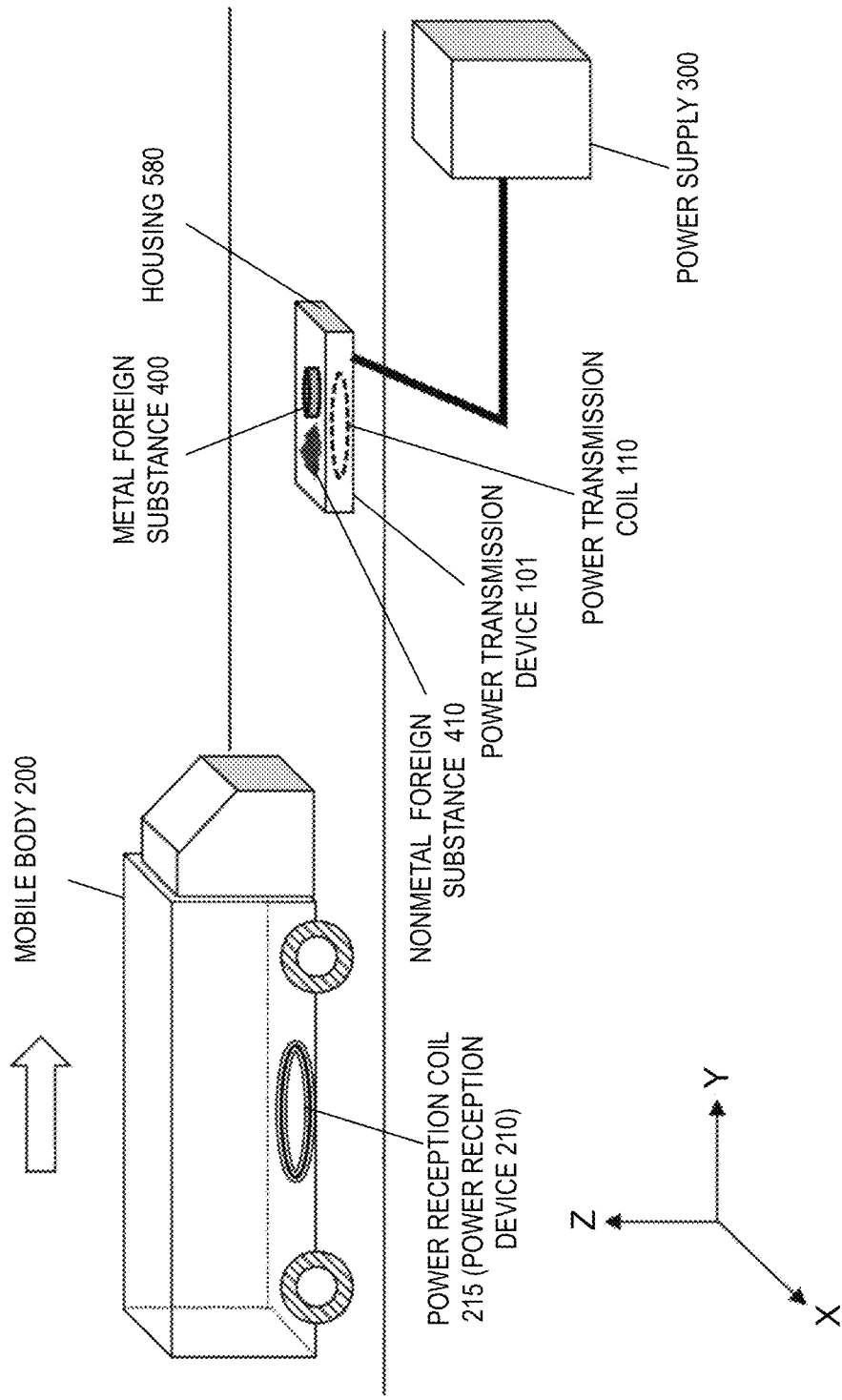
FIG. 1 is a schematic configuration diagram of a wireless power transmission system according to a first exemplary embodiment of the present disclosure.

FIG. 1 is a diagram schematically showing an example of wireless power transmission system 11 that wirelessly supplies power to mobile body 200. In wireless power transmission system 11 here, power transmission coil 110 arranged along a road surface wirelessly transmits power to power reception coil 215 arranged on a bottom surface of mobile body 200. Mobile body 200 is a vehicle driven by an electric motor in this example. Mobile body 200 may be, for example, a vehicle such as a bus, an automobile, a train, or an automatic guided vehicle (AGV), but may be a movable object other than the vehicle.

FIG. 1 shows XYZ coordinates indicating X, Y, and Z directions that are orthogonal to each other. In the following description, the XYZ coordinates that are shown are used. A traveling direction of mobile body 200 is the Y direction, a direction perpendicular to the road surface is the Z direction, and a direction perpendicular to both the Y direction and the Z direction is the X direction. Orientations of structures shown in the drawings of the present application are set in consideration of easy-to-understand explanation, and do not limit orientations when the exemplary embodiments of the present disclosure are actually implemented. Also, shapes and sizes of all or a part of the structures shown in the drawings do not limit actual shapes and sizes.

Wireless power transmission system 11 includes power transmission device 101 and power reception device 210. Power transmission device 101 outputs power supplied from external power supply 300 from power transmission coil 110 to power reception coil 215. Power reception device 210 is provided on mobile body 200. In addition to power reception coil 215, power reception device 210 includes components such as a rectifier circuit and a power reception control circuit, which are not shown.

In such a system, if metal foreign substance 400 is present directly above or in the vicinity of power transmission coil 110, metal foreign substance 400 is heated during power transmission, which may cause a safety problem. Therefore, a technique for detecting such a metal foreign substance during power transmission and removing the metal foreign substance has been proposed so far.

Figure 17:
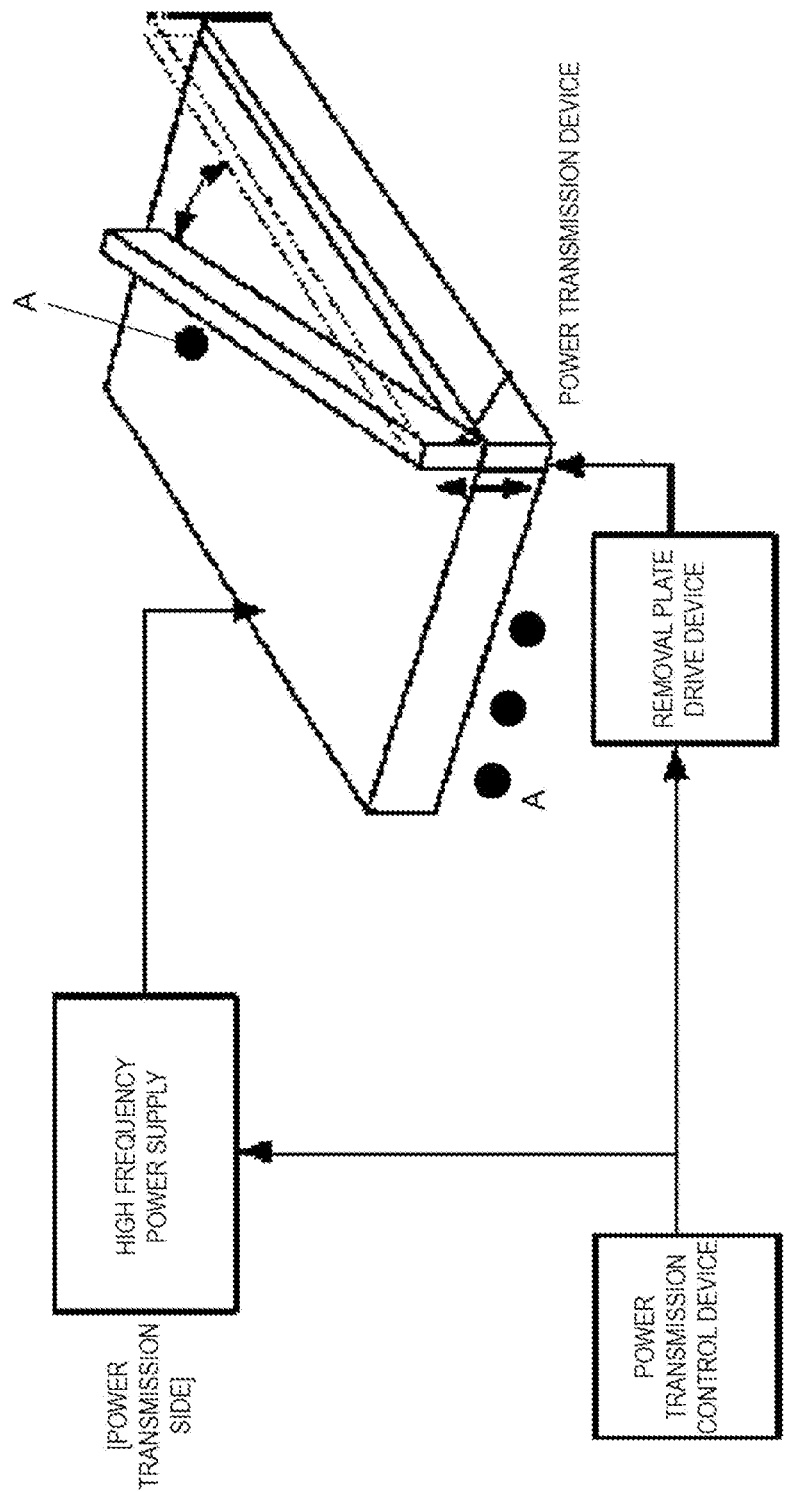
FIG. 17 is a schematic configuration diagram of a power transmission device showing a conventional technique.

For example, PTL 1 discloses a device that removes a metal foreign substance existing on the upper surface of a power transmission device by using a member such as a foreign substance removal plate or a brush. The foreign substance removal plate is a member similar to an automobile wiper. For reference, a part of FIG. 1 of PTL 1 is cited as FIG. 17.

The method disclosed in PTL 1 can certainly remove a foreign substance existing on the upper surface of a power transmission device, but some foreign substances may not be removed. A foreign substance that enters the upper surface of a power transmission coil includes, for example, a coin containing metals such as copper, zinc, or nickel, or a metal foreign substance such as a steel can or aluminum can, as well as a nonmetal foreign substance such as soil or mud, or an animal such as an insect or cat. Some foreign substances may slip between the upper surface (i.e., flat surface) of the power transmission device and the foreign substance removal member, and remain unremoved. As described above, it is difficult to reliably remove a metal foreign substance by a method of removing a metal foreign substance by some means.

In addition, when it clears up after rain, for example, soil and a metal foreign substance are mixed together and the soil dries. In such a case, the metal foreign substance is fixed with the soil on the upper surface of the power transmission device, and it is difficult to reliably remove the metal foreign substance.

The present inventors have found the above problems and examined a configuration for solving these problems. The present inventors have come up with an idea that heat generation of a metal foreign substance can be prevented by moving a moving member on which the metal foreign substance is placed to an outside of a power transmission-side cancel coil, instead of removing the metal foreign substance.

Further, as described above, the present inventors have come up with an idea that even when high output transmission (for example, 120 kW or more) is performed from the power transmission device in a non-contact manner, it is possible to prevent heat generation of a metal foreign substance existing in a peripheral portion of the power transmission device by changing a relative position between the moving member and the power transmission-side cancel coil.

A power transmission device according to one aspect of the present disclosure includes a power transmission coil, a magnetically shielded space created by a power transmission-side cancel coil arranged outside the power transmission coil, a moving member configured to move a metal foreign substance, and a moving mechanism configured to move a part or all of an upper surface of the moving member from an area outside the magnetically shielded space into the magnetically shielded space.

According to the above aspect, it is possible to suppress heat generation of a metal foreign substance existing in a peripheral portion of the power transmission device even if high output power transmission is performed in a non-contact manner.

A power transmission device according to another aspect of the present disclosure includes a power transmission coil, a power transmission-side cancel coil that is arranged outside the power transmission coil and generates a magnetic field opposite to a magnetic field generated by the power transmission coil, a housing provided with the power transmission coil and the power transmission-side cancel coil inside, an opening provided on a surface of the housing above the power transmission coil, a moving member that covers the opening and allows a metal foreign substance to be placed on top, a moving mechanism that moves a part or all of an upper surface of the moving member to an outside of the power transmission-side cancel coil, and a belt that is arranged in the housing and conveys the metal foreign substance that has entered through the opening to an outside of the power transmission-side cancel coil.

According to the above aspect, even if a metal foreign substance intrudes during non-contact power transmission, an operation can be continuously and safely performed.

A power reception device according to another aspect of the present disclosure is a power reception device arranged to face a power transmission device having a power transmission coil, and a moving mechanism that moves a part or all of an upper surface of a moving member on which a metal foreign substance can be placed to an outside of the power transmission coil. The power reception device includes a power reception coil that couples with a magnetic field generated by the power transmission coil, and a power reception-side cancel coil that is arranged outside the power reception coil and generates a magnetic field opposite to a magnetic field generated by the power reception coil.

According to the above aspect, it is possible to suppress heat generation of a metal foreign substance existing in a peripheral portion of the power transmission device even if high output power transmission is performed in a non-contact manner.

First Exemplary Embodiment

Hereinafter, a more specific exemplary embodiment of the present disclosure will be described. However, a more detailed description than necessary may be omitted. For example, the detailed description of already well-known matters and the overlap description of substantially same configurations may be omitted. This is to avoid an unnecessarily redundant description below and to facilitate understanding of a person skilled in the art. It should be noted that the inventors provide the accompanying drawings and the following description in order for those skilled in the art to fully understand the present disclosure, and are not intended to limit the subject matter described in the claims. In the following description, the same or similar components are designated by the same reference numerals.

[Basic Configuration]

As shown in FIG. 1, power transmission device 101 is electrically connected to external power supply 300 via a cable or the like. Power transmission device 101 includes power transmission coil 110 inside housing 580. Foreign substances of metal foreign substance 400 and nonmetal foreign substance 410 may be present on power transmission coil 110 in power transmission device 101.

Figure 2:
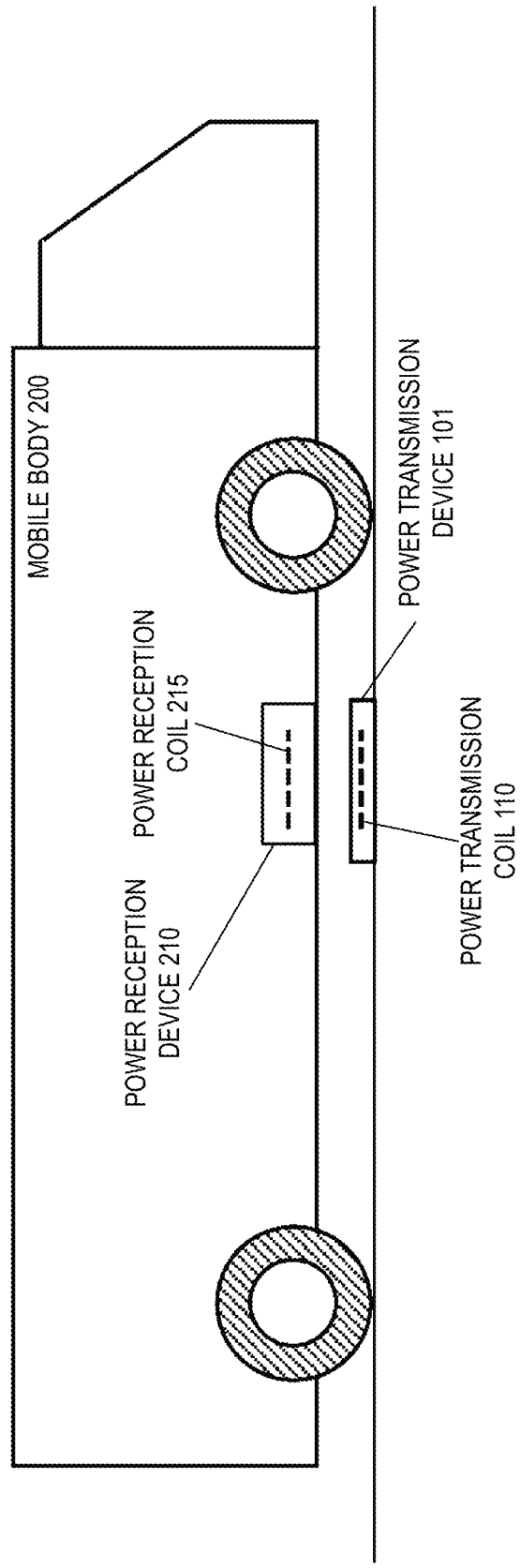
FIG. 2 is a side view of the wireless power transmission system according to the first exemplary embodiment of the present disclosure.

FIG. 2 is a schematic diagram showing a situation in which power transmission coil 110 and power reception coil 215 face each other, and power is transmitted from power transmission coil 110 to power reception coil 215 in a non-contact manner.

As shown in FIG. 2, power transmission coil 110 electromagnetically (or magnetically) couples with power reception coil 215 to output power to power reception coil 215. Power reception coil 215 magnetically couples with power transmission coil 110 by a magnetic field generated from power transmission coil 110 to receive at least a part of the transmitted power (i.e., energy). Power reception coil 215 supplies the received power to a load (such as a secondary battery) in mobile body 200 via a rectifier circuit, which is not shown. As a result, mobile body 200 is charged and supplied with power.

Figure 3:
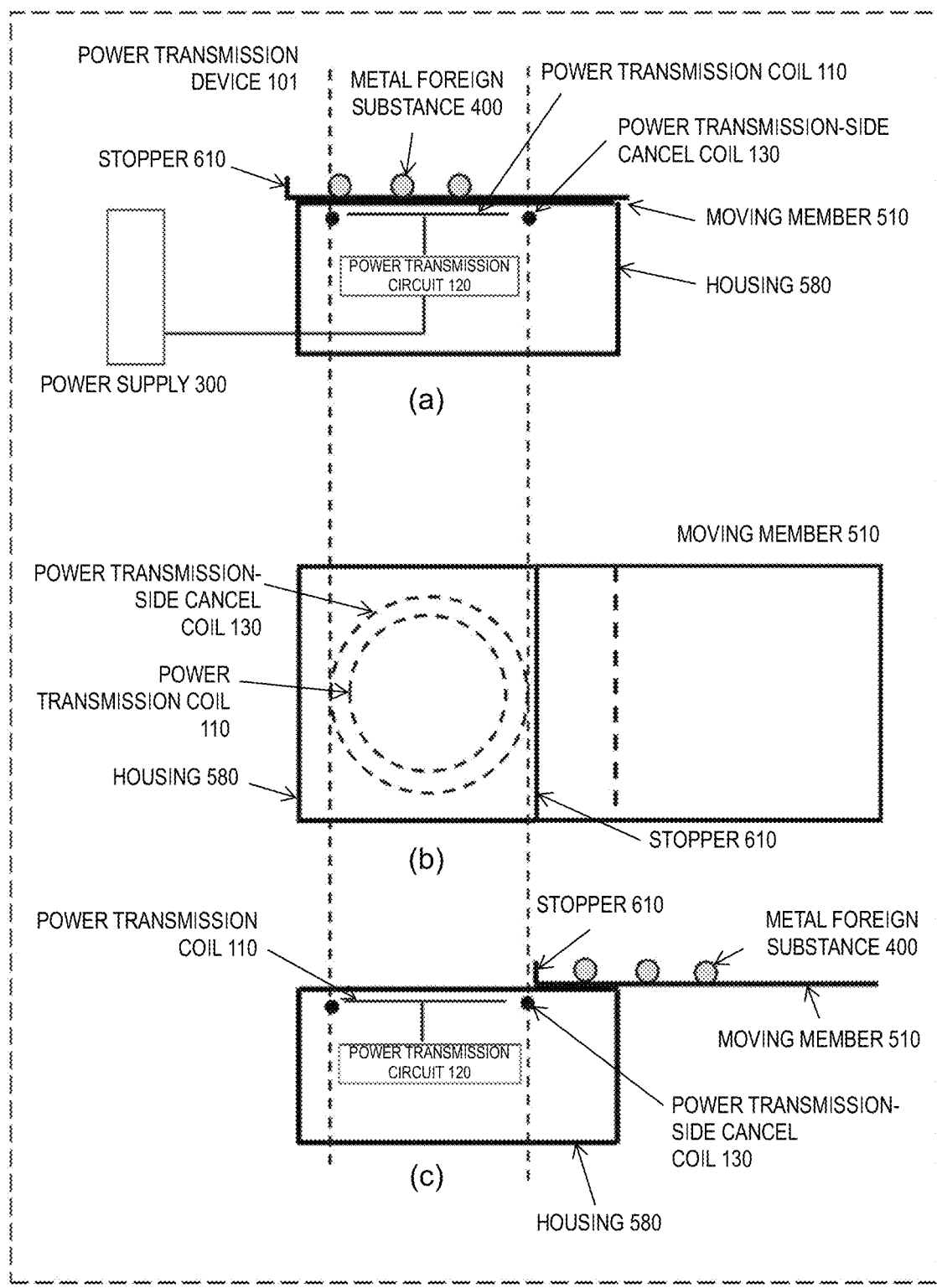
FIG. 3 is a schematic view of a power transmission device according to the first exemplary embodiment of the present disclosure.

FIG. 3 is a diagram schematically showing power transmission device 101. Part (a) of FIG. 3 shows a YZ cross section of power transmission device 101 (before moving member 510 is moved), part (b) of FIG. 3 shows a plan view of power transmission device 101 (after moving member 510 is moved), and part (c) of FIG. 3 shows the YZ cross section of power transmission device 101 (after moving member 510 is moved). Power transmission device 101 here includes housing 580, moving member 510, power transmission coil 110 arranged inside housing 580, power transmission circuit 120, and power transmission-side cancel coil 130.

Power transmission-side cancel coil 130 is arranged outside power transmission coil 110, and generates a magnetic field opposite to a magnetic field generated by power transmission coil 110 by induced electromotive force.

When power transmission coil 110 that generates a magnetic field is present inside power transmission-side cancel coil 130, a magnetically shielded space is a space in which magnetic field strength outside the power transmission-side cancel coil is smaller than the magnetic field strength inside. In a first exemplary embodiment, as shown in FIG. 3, power transmission-side cancel coil 130 is formed in a concentric circle having a radius larger than that of power transmission coil 110, and is arranged outside in a radial direction of power transmission coil 110. However, as long as a magnetically shielded space can be formed, power transmission-side cancel coil 130 does not have to be a strictly concentric circle, and does not have to be strictly radial outside.

As shown in part (b) of FIG. 3, power transmission-side cancel coil 130 preferably has a shape such as a circle, an ellipse, or a rectangle that surrounds power transmission coil 110. Power transmission-side cancel coil 130 is preferably a conductor such as a wire or plate made of copper, aluminum, enamel, or the like, and is a loop coil whose both ends are short-circuited. In the case of a wire, the wire may be wound once or multiple times. In the case of a plate, the plate shape may be stacked in a plurality of layers.

As shown in part (a) of FIG. 3, moving member 510 is arranged on a surface of housing 580, and allows metal foreign substance 400 to be placed on top. It is preferable that stopper 610 is arranged on a side opposite to a traveling direction (right direction) of moving member 510 such that metal foreign substance 400 does not slip off.

Figure 4:
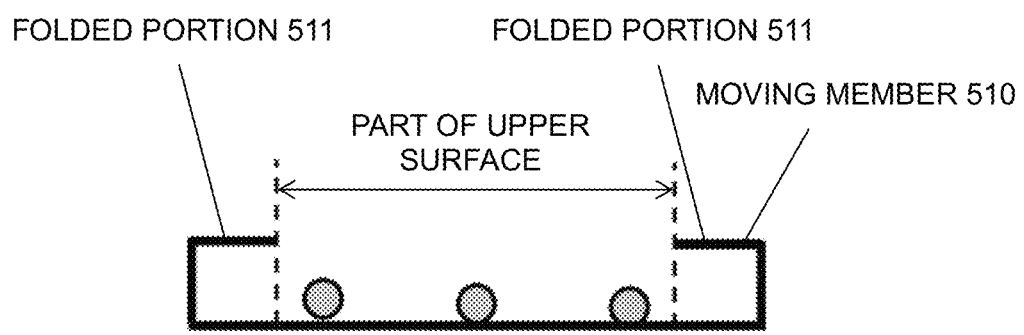
FIG. 4 is a diagram showing a modified example of a moving member according to the first exemplary embodiment of the present disclosure.

Since metal foreign substance 400 enters the surface of housing 580, the surface of moving member 510 is preferably larger than that of power transmission-side cancel coil 130 and housing 580 such that metal foreign substance 400 is not placed on housing 580. As shown in FIG. 4, when there is a folded portion (folded portion 511) at both ends of moving member 510, metal foreign substance 400 may not be able to enter the folded portion. In this case, metal foreign substance 400 can be placed on a part of an upper surface of moving member 510. Metal foreign substance 400 can be placed on a part or all of the upper surface of moving member 510.

Figure 10:
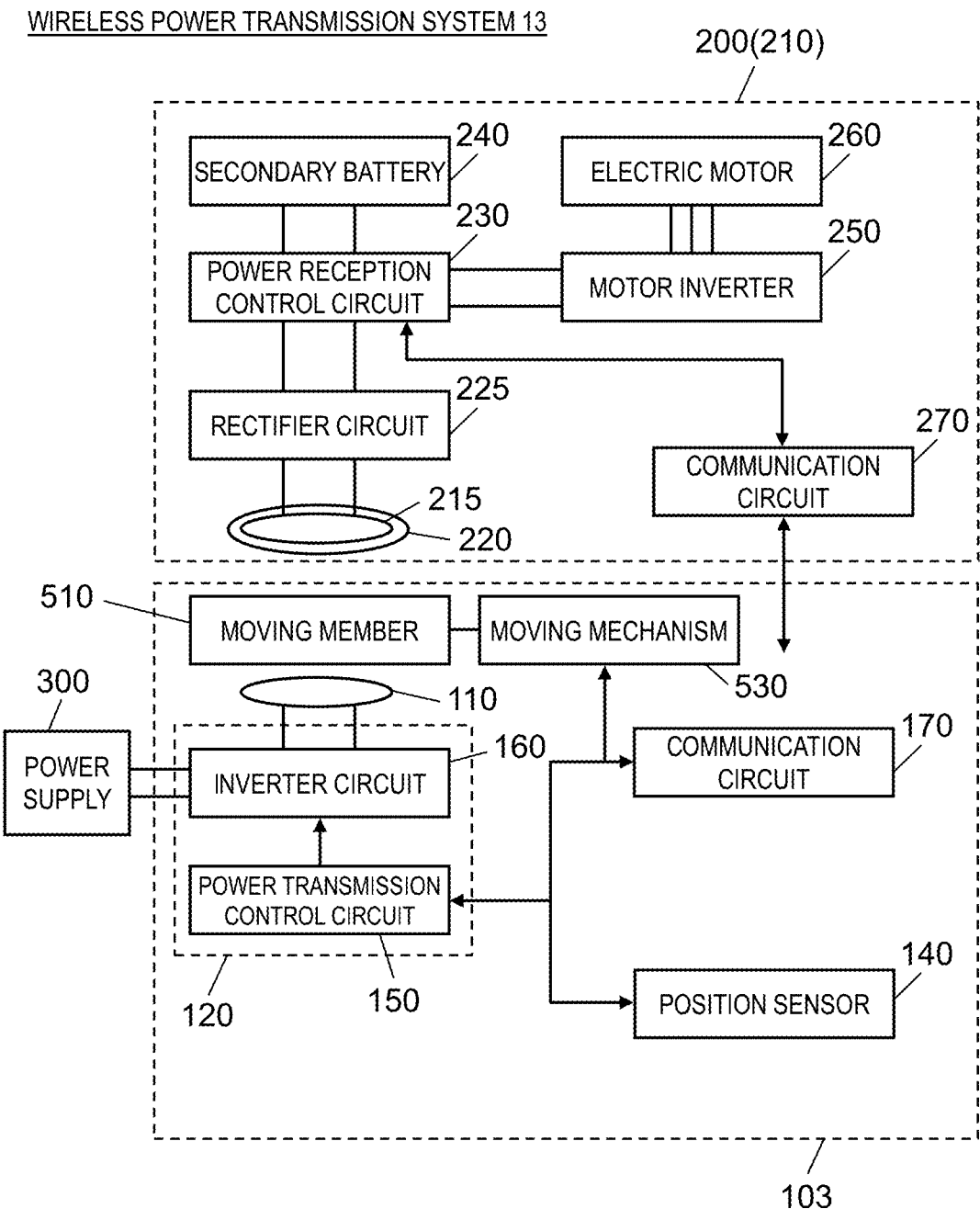
FIG. 10 is a block diagram showing an example of a configuration of the wireless power transmission system according to the third exemplary embodiment of the present disclosure.

As shown in part (c) of FIG. 3, a part or all of the upper surface of moving member 510 on which metal foreign substance 400 can be placed is moved to an outside (magnetically shielded space) of power transmission-side cancel coil 130 by moving mechanism 530 shown in FIG. 10. Therefore, moving mechanism 530 can move metal foreign substance 400 placed on moving member 510 to the magnetically shielded space and prevent heat generation of metal foreign substance 400.

In addition, although moving member 510 is moved to a right side in part (c) of FIG. 3, moving member 510 may be moved to a left side. Further, moving member 510 may be divided into two at substantially a center and moved from a central portion by opening both left and right (double doors).

[Operation]

Figure 5:
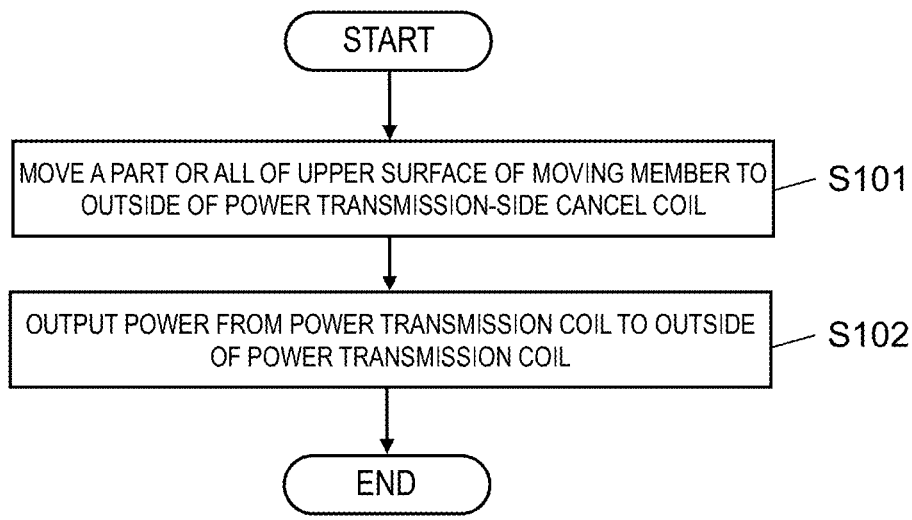
FIG. 5 is a flowchart showing an operation of the power transmission device according to the first exemplary embodiment of the present disclosure.

FIG. 5 is a flowchart showing a basic operation of the power transmission device.

First, moving mechanism 530 is operated to move a part or all of the upper surface of moving member 510 to the outside of power transmission-side cancel coil 130 (S101). It is preferable that mobile body 200 covers power transmission device 101 as shown in FIG. 2 before moving member 510 moves (the state shown in part (a) of FIG. 3).

Next, power is output from power transmission coil 110 to the outside of power transmission coil (for example, power reception coil 215) (S102).

The details of step S102 will be described. As shown in FIG. 3, power transmission circuit 120 converts the power supplied from external power supply 300 into alternating current (AC) power having a frequency and voltage suitable for power transmission, and outputs the power. Power transmission coil 110 is connected to power transmission circuit 120 and transmits the AC power supplied from power transmission circuit 120 to power reception coil 215. Power transmission circuit 120 includes components such as an inverter circuit and a power transmission control circuit, which are not shown in FIG. 3. As a result, it is possible to prevent heat generation of metal foreign substance 400 placed on a part or all of the upper surface of moving member 510, and it is possible to safely output power in a non-contact manner.

Second Exemplary Embodiment

Figure 6:
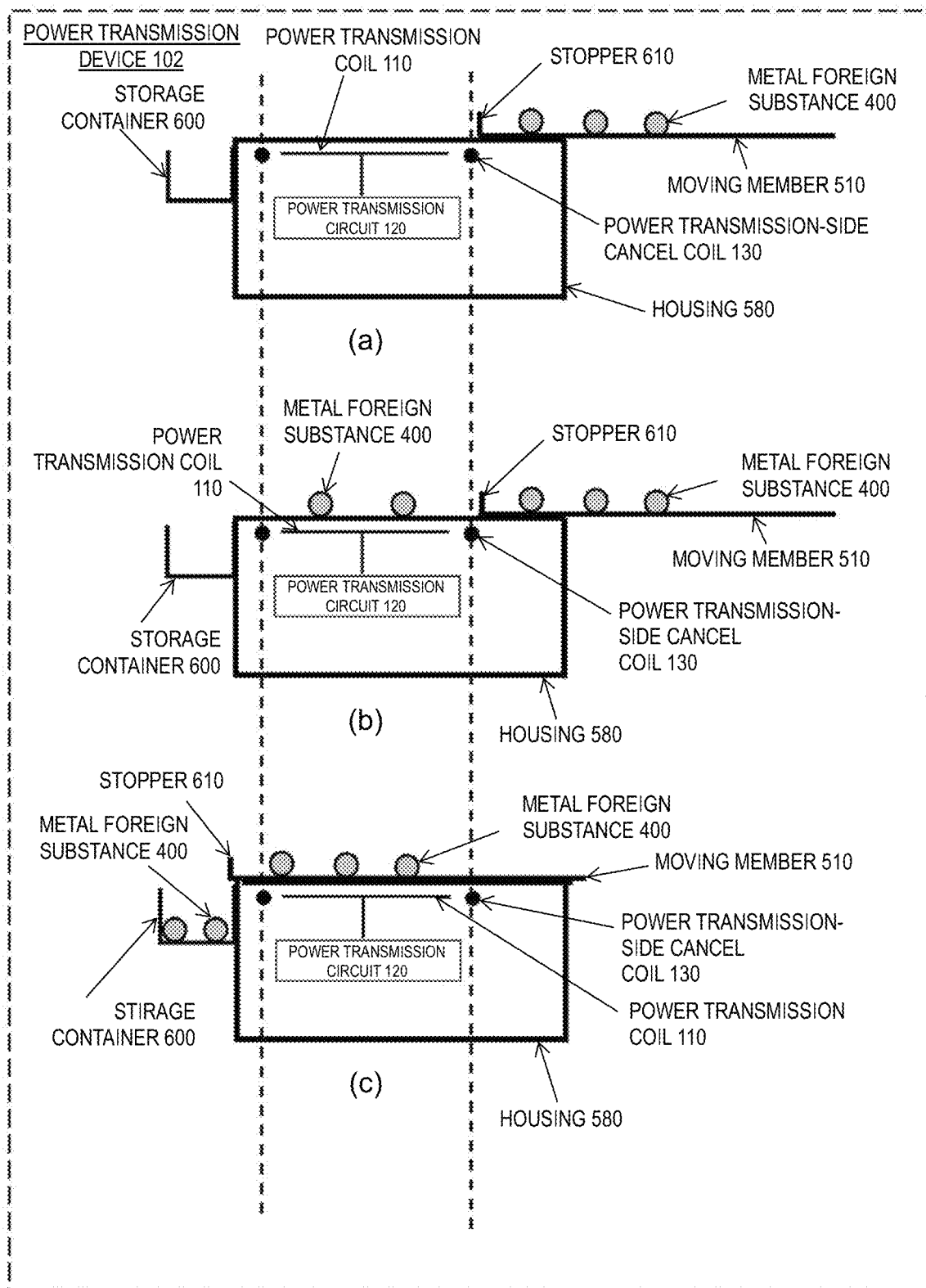
FIG. 6 is a schematic side view of a power transmission device according to a second exemplary embodiment of the present disclosure.

The difference from the first exemplary embodiment is that, as shown in FIG. 6, after moving member 510 has moved (after a metal foreign substance has entered the magnetically shielded space), while moving member 510 is moving metal foreign substance 400, moving member 510 moves metal foreign substance 400 to the outside of power transmission-side cancel coil 130 on a side opposite to a moving direction so as to remove metal foreign substance 400.

Part (a) of FIG. 6 is a diagram corresponding to part (c) of FIG. 3. Part (b) of FIG. 6 is a diagram in a case where metal foreign substance 400 enters a top of housing 580 inside power transmission-side cancel coil 130 when power is output from power transmission coil 110 in a non-contact manner. In this case, an eddy current is generated in metal foreign substance 400 and heat is generated.

Therefore, as shown in part (c) of FIG. 6, moving member 510 is returned so as to move metal foreign substance 400 to the outside of power transmission-side cancel coil 130 on the opposite side of the moving direction. As for the timing of returning moving member 510, moving member 510 may be returned at regular intervals. Alternatively, moving member 510 may be returned through detection of metal foreign substance 400 by a sensor such as a camera or a temperature sensor. Further, after metal foreign substance 400 is detected, the output of power from power transmission coil 110 to the outside of the power transmission coil (for example, power reception coil 215) may be reduced or stopped, and then moving member 510 may be returned. As a result, heat generation of metal foreign substance 400 can be prevented.

As shown in FIG. 6, metal foreign substance 400 is preferably stored in storage container 600 arranged on a side surface of power transmission device 102 or the like.

In order to output power in a non-contact manner again, as shown in part (a) of FIG. 6, a part or all of the upper surface of moving member 510 is moved to the outside of power transmission-side cancel coil 130, and power is output from power transmission coil 110 in a non-contact manner. By repeating parts (a) to (c) in FIG. 6, power can be continuously and safely output from power transmission coil 110 in a non-contact manner.

[Operation]

Figure 7:
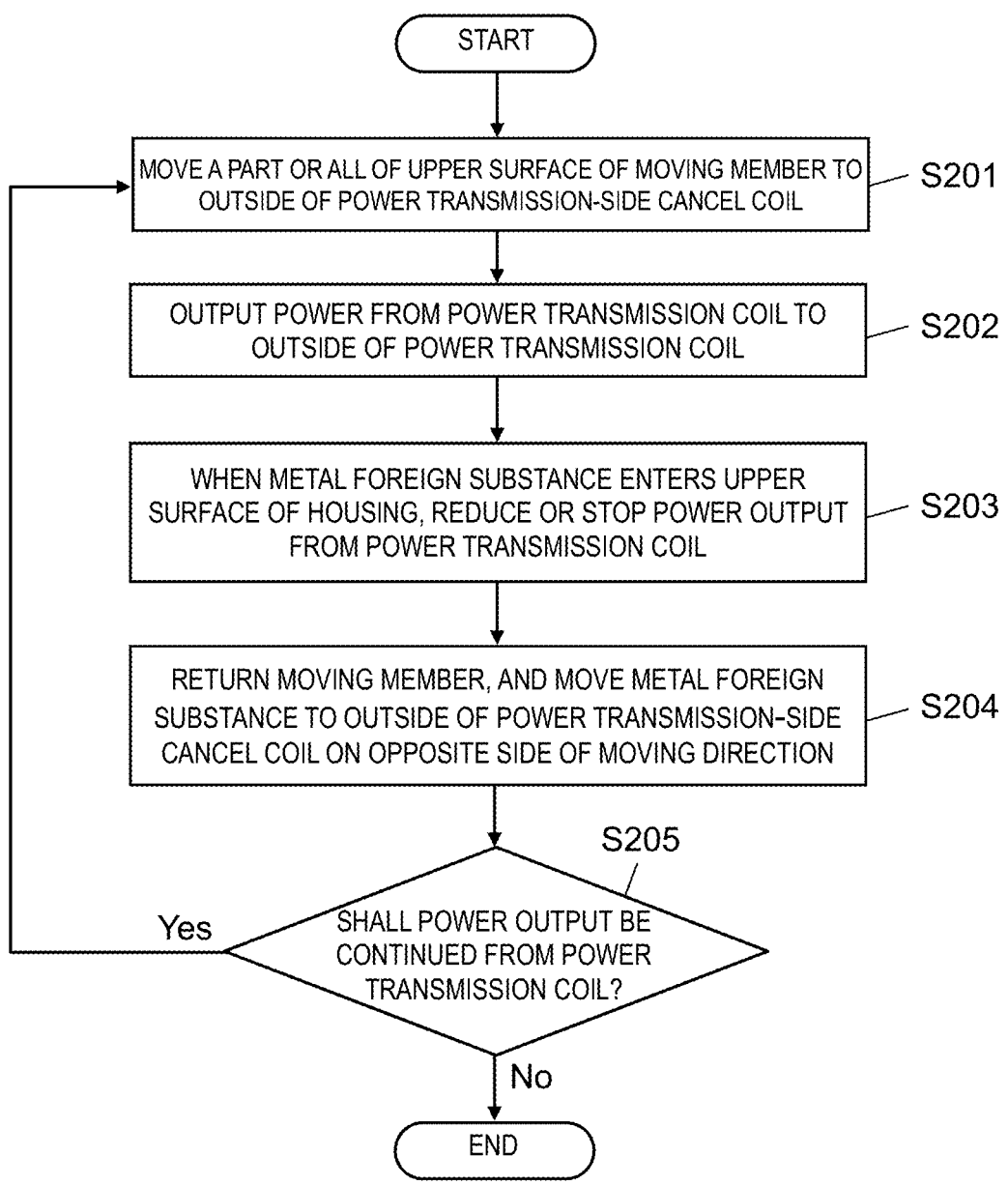
FIG. 7 is a flowchart showing an operation of the second exemplary embodiment of the present disclosure.

FIG. 7 is a flowchart showing an operation of the power transmission device shown in FIG. 6.

First, a moving mechanism (FIG. 10) not shown in FIG. 3 is operated to move a part or all of the upper surface of the moving member to the outside of the power transmission-side cancel coil (S201). It is preferable that mobile body 200 covers the power transmission device before the moving member moves.

Next, power is output from the power transmission coil to the outside of the power transmission coil (for example, the power reception coil) (S202).

Next, when a metal foreign substance enters the upper surface of the housing, the power output from the power transmission coil is reduced or stopped (S203).

Next, the moving member is returned, and the metal foreign substance is moved to the outside of the power transmission-side cancel coil on the opposite side of the moving direction (S204).

Whether to continue the power output from the power transmission coil is determined (S205). If the power output is continued (Yes), the process returns to step S201. If the power output is not continued (No), the process ends.

Figure 8:
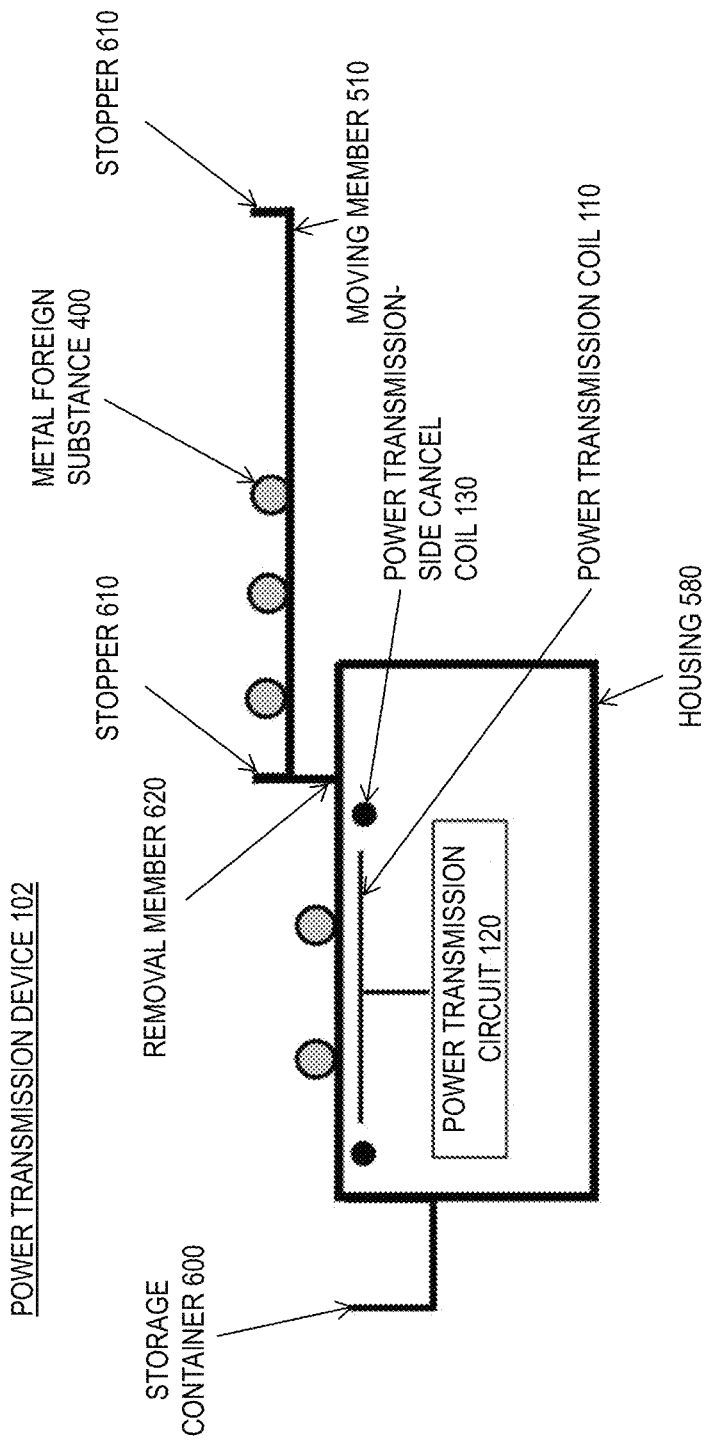
FIG. 8 is a schematic side view showing a modified example of the power transmission device according to the second exemplary embodiment of the present disclosure.

As shown in FIG. 8, power transmission device 102 may be provided with removal member 620 for metal foreign substance 400 in which an end portion of the moving member on a side opposite to the moving direction is in contact with a surface of housing 580. In that case, there may be a gap between the surface of housing 580 and moving member 510. As a result, a contact area between the surface of housing 580 and moving member 510 is reduced, so that a load on the moving mechanism can be reduced.

Removal member 620 is preferably in the form of a plate or a brush, and the material is preferably a metal such as stainless steel or aluminum, resin, wood, rubber, cloth, thread or the like.

Stopper 610 may be arranged at both end portions of moving member 510.

Third Exemplary Embodiment

The difference from the first and second exemplary embodiments is that power reception device 210 is arranged so as to face power transmission device 103, as shown in FIG. 9.

FIG. 9 shows wireless power transmission system 13 that outputs power from a power transmission device to power reception device 210 in a non-contact manner. Power transmission device 103 shown in FIG. 9 differs from power transmission device 101 of the first exemplary embodiment in that power transmission device 103 does not have power transmission-side cancel coil 130. Part (a) of FIG. 9 shows a state before moving member 510 is moved, and part (b) of FIG. 9 shows a state after moving member 510 is moved. As shown in FIG. 9, power transmission coil 110 included in power transmission device 103 and power reception coil 215 included in power reception device 210 face each other, and power transmission coil 110 and power reception coil 215 are electromagnetically coupled.

As shown in FIG. 9, power reception-side cancel coil 220 may be arranged outside power reception coil 215 and may generate a magnetic field opposite to a magnetic field generated by power reception coil 215 by induced electromotive force.

Power reception-side cancel coil 220 can weaken the magnetic field generated by power reception coil 215 in a space outside power reception-side cancel coil 220, and creates a magnetically shielded space. In a third exemplary embodiment, power reception-side cancel coil 220 is formed in a concentric circle having a radius larger than that of power reception coil 215 and is arranged outside in a radial direction of power reception coil 215. However, as long as a magnetically shielded space can be formed, power reception-side cancel coil 220 does not have to be a strictly concentric circle, and does not have to be strictly radial outside.

Power transmission device 103 makes an adjustment by moving moving member 510 such that a part or all of the upper surface of moving member 510 on which metal foreign substance 400 can be placed is located outside power reception-side cancel coil 220. As a result, it is possible to prevent heat generation of metal foreign substance 400 placed on moving member 510. The method for removing a metal foreign substance described in the second exemplary embodiment can also be applied.

FIG. 10 is a block diagram showing an example of a configuration of wireless power transmission system 13 of FIG. 9. Power transmission device 103 includes above-mentioned power transmission coil 110, power transmission circuit 120, position sensor 140, moving member 510, moving mechanism 530, and communication circuit 170. Power transmission circuit 120 includes inverter circuit 160 and power transmission control circuit 150. Inverter circuit 160 is connected between external power supply 300 and power transmission coil 110.

Inverter circuit 160 converts direct current (DC) power supplied from power supply 300 into AC power, and supplies the AC power to power transmission coil 110. Power transmission control circuit 150 controls inverter circuit 160, communication circuit 170, position sensor 140, and moving mechanism 530. Power transmission control circuit 150 controls conduction/non-conduction of a plurality of switching elements in inverter circuit 160, for example, to output AC power having a desired frequency and voltage. Power transmission control circuit 150 further controls moving mechanism 530 to change the position of moving member 510. Communication circuit 170 transmits and receives signals to and from communication circuit 270 in mobile body 200. Position sensor 140 plays a role of measuring a relative position between power reception device 210 (mobile body 200) and power transmission device 103.

Moving mechanism 530 may change a relative position between housing 580 and moving member 510. Moving mechanism 530 may employ, for example, a mechanical type in which, for example, a part of mobile body 200 comes into contact to push moving member 510, an electric type such as a linear motor, a combination of the mechanical type and the electric type such as a linear motion mechanism provided with an electric motor and a plurality of gears (including a rack and pinion), or the like.

Mobile body 200 (power reception device 210) includes power reception coil 215, power reception-side cancel coil 220, rectifier circuit 225, power reception control circuit 230, secondary battery 240, communication circuit 270, electric motor 260, and motor inverter 250. Rectifier circuit 225 is connected to power reception coil 215, converts AC power output from power reception coil 215 into DC power, and outputs the DC power.

Electric motor 260 is a motor for driving mobile body 200, and is driven by, for example, three-phase AC power. Motor inverter 250 converts supplied DC power into three-phase AC power, and supplies the three-phase AC power to electric motor 260. Power reception control circuit 230 controls secondary battery 240 to be charged by DC power output from rectifier circuit 225, and controls motor inverter 250 and communication circuit 270.

For example, mobile body 200 in the present exemplary embodiment approaches power transmission device 103 for charging when a storage amount of secondary battery 240 becomes low.

Power transmission control circuit 150 drives inverter circuit 160 to start power transmission. Power transmitted by a magnetic field coupling between power transmission coil 110 and power reception coil 215 is stored in secondary battery 240. When the charging of secondary battery 240 is completed, mobile body 200 drives electric motor 260 by the power stored in secondary battery 240 and resumes traveling.

Position sensor 140 measures a relative position between power transmission device 103 and mobile body 200 by using, for example, light, radio waves, pressure, sound waves, and the like. Position sensor 140 may be, for example, a normal image sensor or a distance measuring device such as a time of flight (TOF) sensor. Position sensor 140 detects the position of mobile body 200 with respect to power transmission device 103. Based on information output from position sensor 140, power transmission control circuit 150 can grasp the relative positional relationship between mobile body 200 and power transmission device 103 (for example, the distance between mobile body 200 and power transmission device 103). When mobile body 200 covers moving member 510, mobile body 200 serves as a barrier, so that metal foreign substance 400 is unlikely to come into contact with moving member 510. Therefore, when mobile body 200 covers moving member 510, it is preferable that the power transmission control circuit starts moving member 510.

Figure 11:
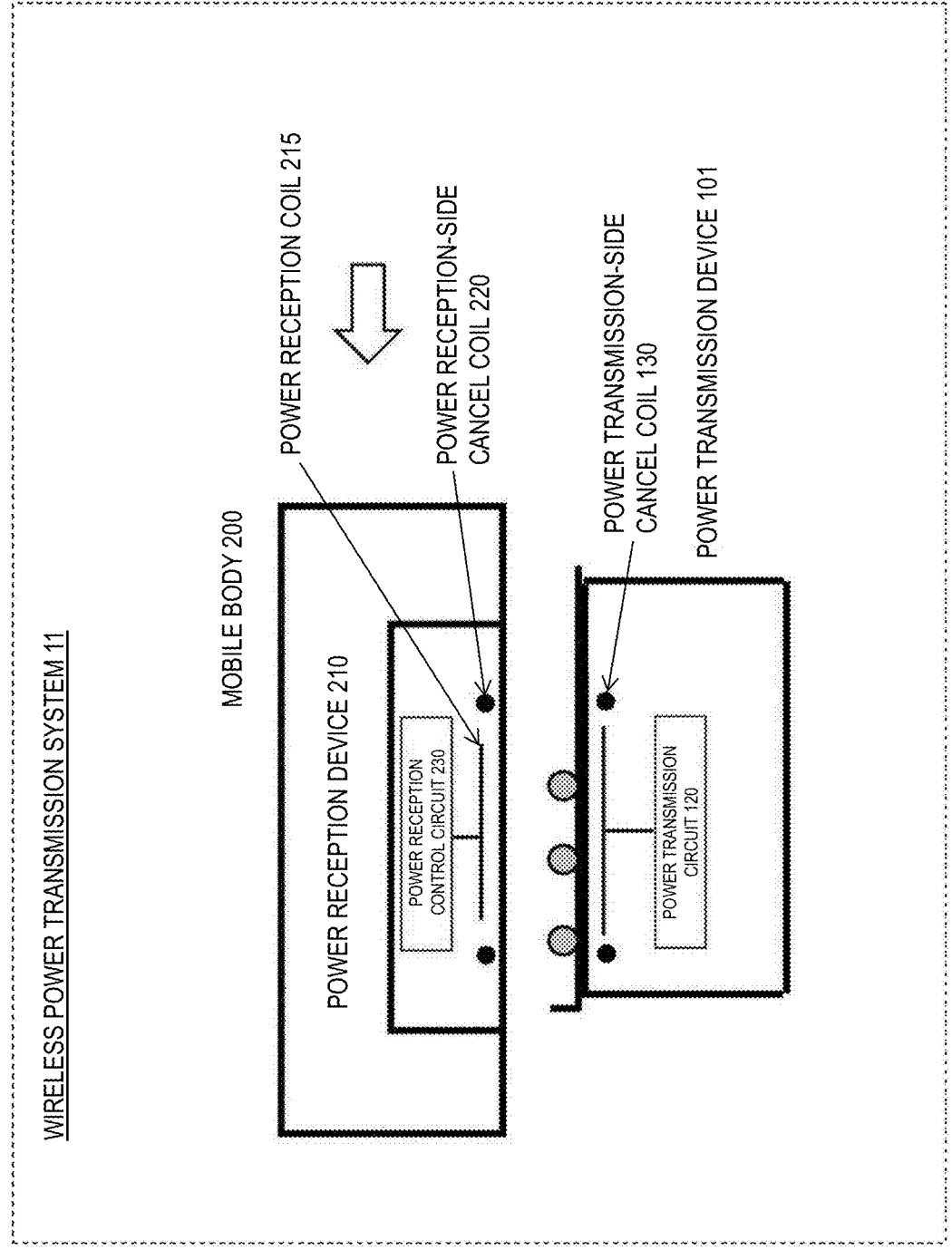
FIG. 11 is a schematic side view of a modified example of the wireless power transmission system according to the third exemplary embodiment of the present disclosure.

FIG. 11 shows wireless power transmission system 11 which is a modified example of FIG. 9. Power transmission device 103 shown in FIG. 9 applies to a case where power transmission-side cancel coil 130 as shown in FIG. 3 is not arranged. Power transmission device 101 shown in FIG. 11 is the same as power transmission device 101 of FIG. 3, and power transmission-side cancel coil 130 is arranged.

Fourth Exemplary Embodiment

Figure 12:
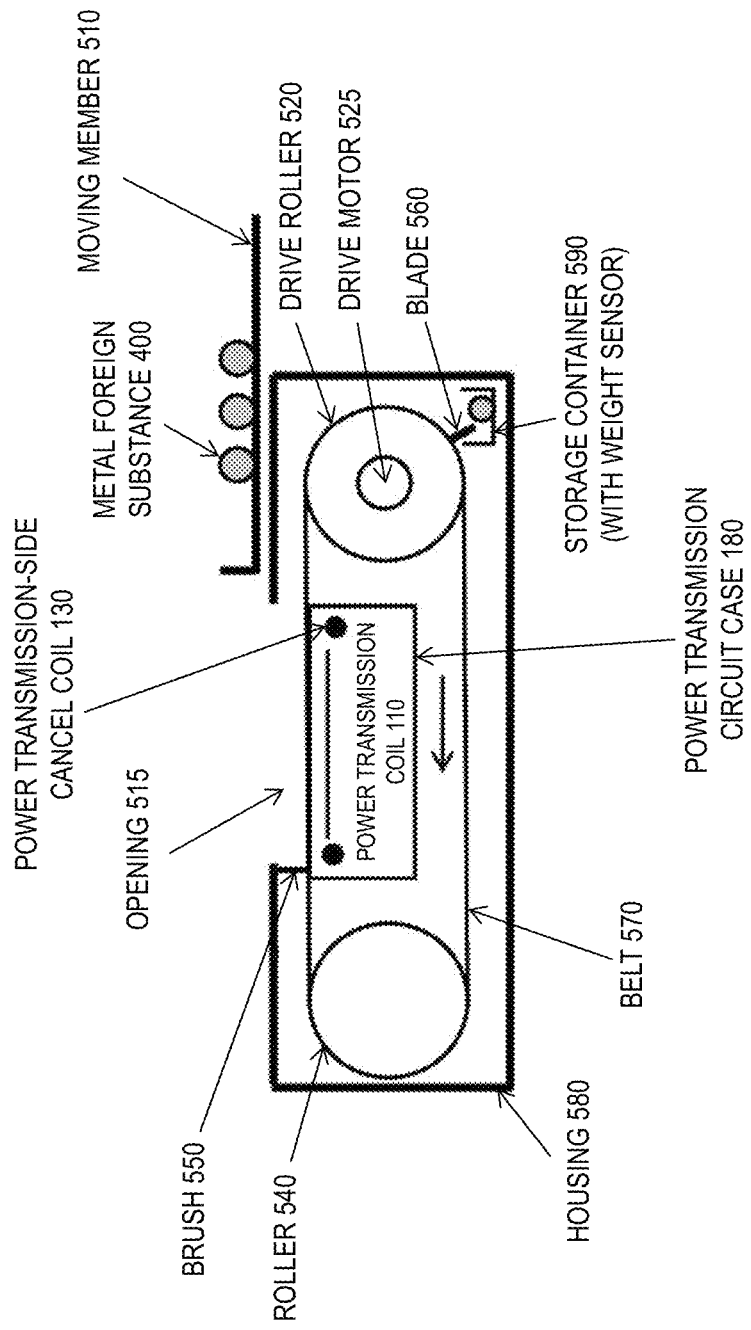
FIG. 12 is a schematic side view of a power transmission device according to a fourth exemplary embodiment of the present disclosure.

FIG. 12 is a cross-sectional view schematically showing a configuration of a power transmission device according to a fourth exemplary embodiment. Power transmission device 104 in the present exemplary embodiment is different from power transmission device 101 in the first exemplary embodiment in that a belt conveyor is provided in housing 580. Other than that, the configuration is basically the same as the configuration of power transmission device 101 in the first exemplary embodiment.

In power transmission device 104 of the present exemplary embodiment, after moving member 510 is moved from an initial position (the state in which moving member 510 covers opening 515), when a foreign substance (for example, metal foreign substance 400) passes through opening 515 and enters an inside of housing 580 during power supply, the foreign substance is removed by the belt conveyor.

The belt conveyor includes belt 570, roller 540, drive roller 520, drive motor 525, and blade 560.

Power transmission circuit case 180 is a case for protecting power transmission coil 110. Power transmission circuit case 180 may include power transmission circuit 120. If it is not necessary to protect power transmission coil 110, power transmission circuit case 180 may not be provided.

Belt 570 is a flexible strip-shaped member, which is arranged so as to surround power transmission circuit case 180. Belt 570 is held by roller 540 and drive roller 520 arranged on both sides of power transmission circuit case 180. Drive roller 520 is connected to drive motor 525. In the present exemplary embodiment, a rotation direction of belt 570 is clockwise. Drive motor 525 rotates drive roller 520 in response to an instruction from power transmission control circuit 150.

Blade 560 is arranged close to an outer circumference of drive roller 520. Blade 560 is fixed to, for example, housing 580. It is preferable that blade 560 and belt 570 on the outer circumferential portion of drive roller 520 are in contact with each other. There may be a slight gap between blade 560 and belt 570 as long as a foreign substance can be removed. Blade 560 is installed so as to drop a foreign substance that moves with the rotation of belt 570. The foreign substance dropped by blade 560 is stored in storage container 590 included in power transmission device 104.

Belt 570 is arranged in housing 580 and rotates to convey metal foreign substance 400 that has entered through opening 515 to the outside of power transmission-side cancel coil 130. Belt 570 may be made of, for example, a material that is less likely to generate heat due to power output from power transmission coil 110. For example, it is desirable that belt 570 is made of a non-metal such as resin, rubber, or cloth, or a material containing a non-magnetic material. Belt 570 is held between drive roller 520 and roller 540 and is rotated by drive motor 525. When moving member 510 moves from opening 515 and opening 515 is open, belt 570 moves the foreign substance that has entered through opening 515 to the position of storage container 590, and stores the foreign substance.

Blade 560 may have a function of removing metal foreign substance 400 from belt 570, and the material and shape are not particularly limited. Blade 560 can be, for example, an aluminum or stainless steel plate, or a rubber member such as a wiper used in an automobile windshield. In the cross-sectional view shown in FIG. 12, when considering a coordinate plane with the position of the rotation axis of drive roller 520 as the origin, blade 560 is preferably attached in the fourth quadrant of the coordinate plane. If the direction of rotation of drive roller 520 (moving direction of belt 570) is opposite to the direction shown in FIG. 12, blade 560 is preferably attached in the third quadrant in the coordinate plane with the position of the rotation axis of the roller 540 as the origin. That is, blade 560 is preferably provided in the vicinity of a portion of belt 570 in contact with drive roller 520 or roller 540, which is located below the rotation axis of each roller.

Moving member 510 in the present exemplary embodiment may be arranged so as to close opening 515 and may have a structure for preventing metal foreign substance 400 from entering housing 580, and the material is not particularly limited.

A weight sensor may be arranged under storage container 590. By providing the weight sensor, the weight of a foreign substance stored in storage container 590 can be measured. When the total weight of foreign substances measured by the weight sensor exceeds a threshold value, power transmission control circuit 150 may transmit a signal indicating the total weight exceeding the threshold value to another device (for example, a smartphone or a server computer) via communication circuit 170. This allows, for example, an administrator to dispatch a cleaner to remove the foreign substances in storage container 590 or replace storage container 590 with new storage container 590.

As shown in FIG. 12, brush 550 is arranged upstream of power transmission coil 110 to prevent a foreign substance from entering from a counterclockwise direction opposite to the rotation direction of belt 570.

Although moving member 510 is moved to the right in FIG. 12, moving member 510 may be moved to the left.

Further, moving member 510 may be divided into two at substantially a center and moved from a central portion by opening both left and right (double doors).

[Operation]

Figure 13:
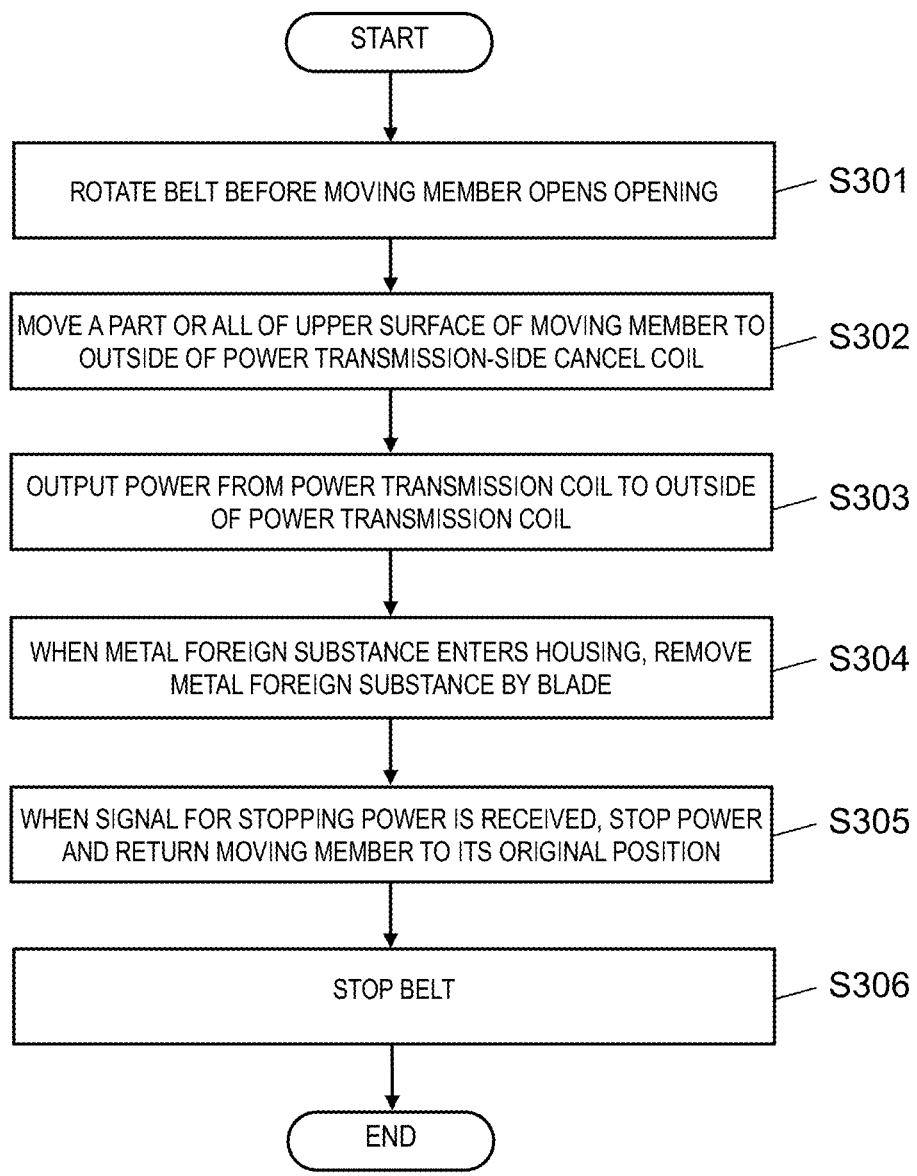
FIG. 13 is a flowchart showing an operation of the fourth exemplary embodiment of the present disclosure.

FIG. 13 is a flowchart showing an operation of FIG. 12.

First, belt 570 is rotated before moving member 510 opens opening 515 (S301).

Next, moving mechanism 530, which is not shown in FIG. 12, is operated to move a part or all of the upper surface of moving member 510 to the outside of power transmission-side cancel coil 130 (S302). It is preferable that mobile body 200 covers power transmission device 104 before moving member 510 moves.

Next, power is output from power transmission coil 110 to the outside of the power transmission coil (for example, power reception coil 215) (S303).

Next, when metal foreign substance 400 enters the housing, metal foreign substance 400 is conveyed by belt 570 and metal foreign substance 400 is removed by blade 560 (S304).

Next, when a signal for stopping the power is received, for example, when the charging of the secondary battery is completed, the power is stopped and moving member 510 is returned to its original position (S305).

Next, belt 570 is stopped (S306).

In step S301, belt 570 may be rotated after moving member 510 opens opening 515.

By the above operation, metal foreign substance 400 can be removed without being detected by rotating belt 570 while the power is being output from power transmission coil 110 to the outside of the power transmission coil.

The solutions and methods in the first to third exemplary embodiments can be applied to the present exemplary embodiment as long as there is no contradiction.

Fifth Exemplary Embodiment

Figure 14A:
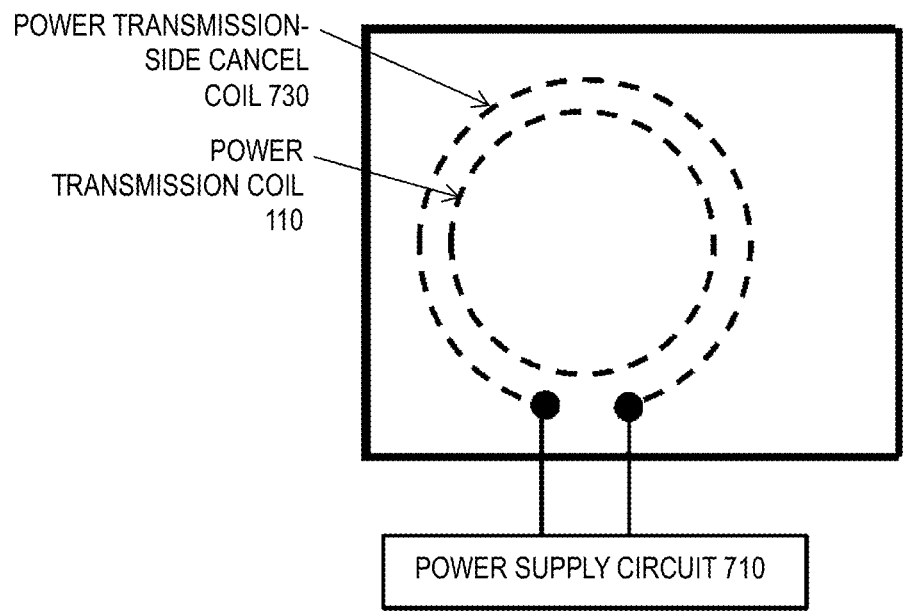
FIG. 14A is a schematic configuration diagram of a power transmission-side cancel coil according to a fifth exemplary embodiment of the present disclosure.

The difference from the first to fourth embodiments is that power transmission-side cancel coil 730 is connected to power supply circuit 710 as shown in FIG. 14A.

Figure 14B:
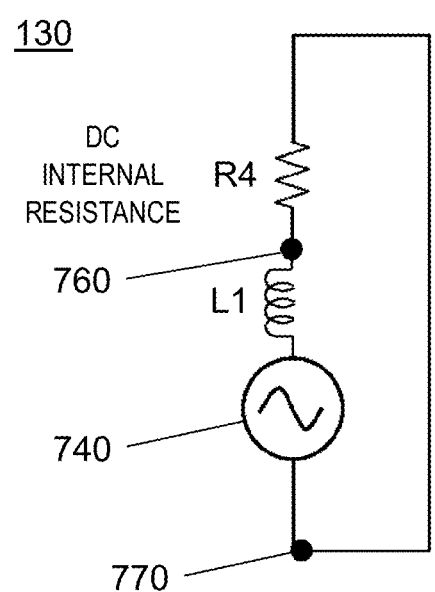
FIG. 14B is a circuit diagram of the power transmission-side cancel coil according to the fifth exemplary embodiment of the present disclosure.

In order to explain an operation of this exemplary embodiment, first, an operation of power transmission-side cancel coil 130 composed of a loop coil with both ends short-circuited, as in the first, second, and fourth exemplary embodiments, will be described. FIG. 14B is a diagram showing an equivalent circuit when both ends of power transmission-side cancel coil 130 are short-circuited. Note that in principle, the operation of power transmission-side cancel coil 130 described here and the operation of power reception-side cancel coil 220 are exactly the same. Therefore, when the common operation is explained below, power transmission-side cancel coil 130 is used for the explanation. As shown in FIG. 14B, power transmission-side cancel coil 130 is equivalently composed of a series circuit of inductance L1 and DC internal resistance R4.

Induced electromotive voltage Vc740 is generated in power transmission-side cancel coil 130 by mutual induction with power transmission coil 110 and/or power reception coil 215. Then, current Ic flows due to induced electromotive voltage Vc740, but since the DC circuit has inductance L1 and internal resistance R4 as impedance, voltage of self-induced electromotive voltage $Vs=L1 \times dIc/dt+R4 \times Ic$ is generated. In order for power transmission-side cancel coil 130 to operate ideally and total magnetic flux generated inside and outside power transmission-side cancel coil 130 to be zero, mutual induction electromotive voltage Vc due to an external magnetic field and self-induced electromotive voltage Vs due to current Ic flowing through power transmission-side cancel coil 130 need to have the same magnitude in opposite phases and be balanced. That is, in FIG. 14B, when virtual voltage measurement point 760 is provided between inductance L1 and internal resistance R4, a potential difference between first end point 770 of power transmission-side cancel coil 130 and virtual voltage measurement point 760 is required to be zero.

However, there is internal resistance R4 in parallel between these two points, and as long as self-induced electromotive force is generated in power transmission-side cancel coil 130, current Ic that does not become zero flows. Therefore, there is always a potential difference corresponding to R4×Ic between first end point 770 of power transmission-side cancel coil 130 and virtual voltage measurement point 760. Therefore, in order for power transmission-side cancel coil 130 to operate well, it is better to make a value of internal resistance R4 as small as possible and bring a potential of virtual voltage measurement point 760 as close to zero as possible. For this reason, in power transmission-side cancel coil 130 using a loop coil with both ends short-circuited, the electric conductivity of the coil material is preferably made as large as possible (ideally infinite using a superconducting material) so as to secure a coil cross-sectional area that is as large as possible.

However, when a material having finite electric conductivity is used as the material of power transmission-side cancel coil 130, internal resistance R4 cannot be made zero. Therefore, in a fifth exemplary embodiment, supplying a predetermined current from power supply circuit 710 located outside to power transmission-side cancel coil 730 is considered so as to actively control the potential of virtual voltage measurement point 760 to zero. Power transmission-side cancel coil 730 includes at least a loop coil connected to power supply circuit 710 capable of supplying a DC and/or AC. Specifically, the potential of virtual voltage measurement point 760 can be actively controlled to zero by using negative resistance circuit 750 as shown in the rectangular portion of the alternate long and short dash line in FIG. 15.

Figure 15:
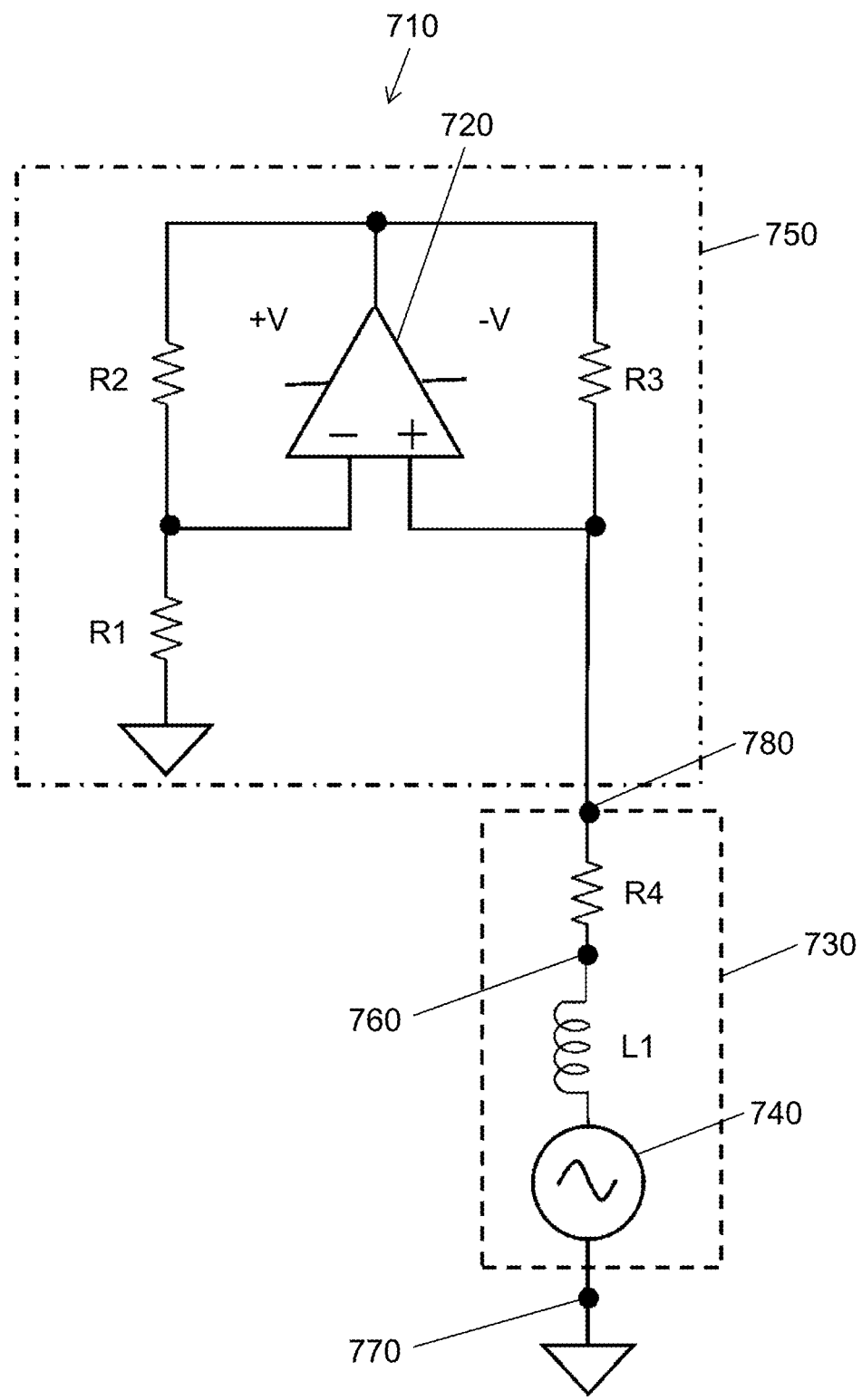
FIG. 15 is a diagram showing an example of a negative resistance circuit according to the fifth exemplary embodiment of the present disclosure.

The dotted rectangular portion in FIG. 15 is an equivalent circuit of power transmission-side cancel coil 730. Internal resistance R4, inductance L1, and AC power supply 740 showing mutual induction electromotive force are connected in series.

In this case, power supply circuit 710 includes negative resistance circuit 750. In negative resistance circuit 750, resistor R1, resistor R2, and resistor R3 are arranged around amplifier circuit 720 having a large amplification factor such as an operational amplifier. When this circuit is used, for apparent resistance Rin of negative resistance circuit 750 as seen from a terminal to which second end point 780, which is different from first end point 770 of power transmission-side cancel coil 730, a formula below is established.

$$Rin = -R3 \times R1/R2 \quad \text{(Formula 1)}$$

Therefore, when this negative resistance Rin is connected in series with power transmission-side cancel coil 730, an antiphase potential corresponding to a potential difference generated in internal resistance R4 can be generated at second end point 780 of power transmission-side cancel coil 730. For that purpose, it is preferable to adjust resistance values of resistors R1 to R3 so as to satisfy the following Formula 2 according to internal resistance R4 of power transmission-side cancel coil 730 to be used.

$$R2/R1 = R3/R4 \quad \text{(Formula 2)}$$

According to the above aspect, the potential of virtual voltage measurement point 760 can be made zero or close to zero, and preferably, mutual induction electromotive voltage Vc due to the external magnetic field and self-induced electromotive voltage Vs due to current Ic flowing through power transmission-side cancel coil 730 can be adjusted to have the same magnitude and be balanced in opposite phases. Therefore, power transmission-side cancel coil 730 can operate ideally, and the total magnetic flux generated inside and outside power transmission-side cancel coil 730 can be made or close to zero.

Although FIG. 15 shows only negative resistance circuit 750 necessary for the operation explanation, power supply circuit 710 is not limited to this configuration. For example, power supply circuit 710 may include other accompanying circuits such as a power supply circuit of an amplifier circuit, a current booster circuit, an impedance detection circuit of power transmission-side cancel coil 730, a phase compensation circuit for preventing transmission, and a circuit for adjusting resistance values of resistors R1 to R3. Further, negative resistance circuit 750 is not limited to the circuit shown in FIG. 15, and may be another circuit showing a tendency that a predetermined terminal potential decreases with an increase in a current flowing into a predetermined terminal. Further, first end point 770 and second end point 780 of power transmission-side cancel coil 730 may be replaced with each other. Further, power reception-side cancel coil 220 can be configured as a cancel coil connected to power supply circuit 710, similarly to power transmission-side cancel coil 730.

The solutions and methods in the first to fourth exemplary embodiments can be applied to the present exemplary embodiment as long as there is no contradiction.

Sixth Exemplary Embodiment

Figure 16:
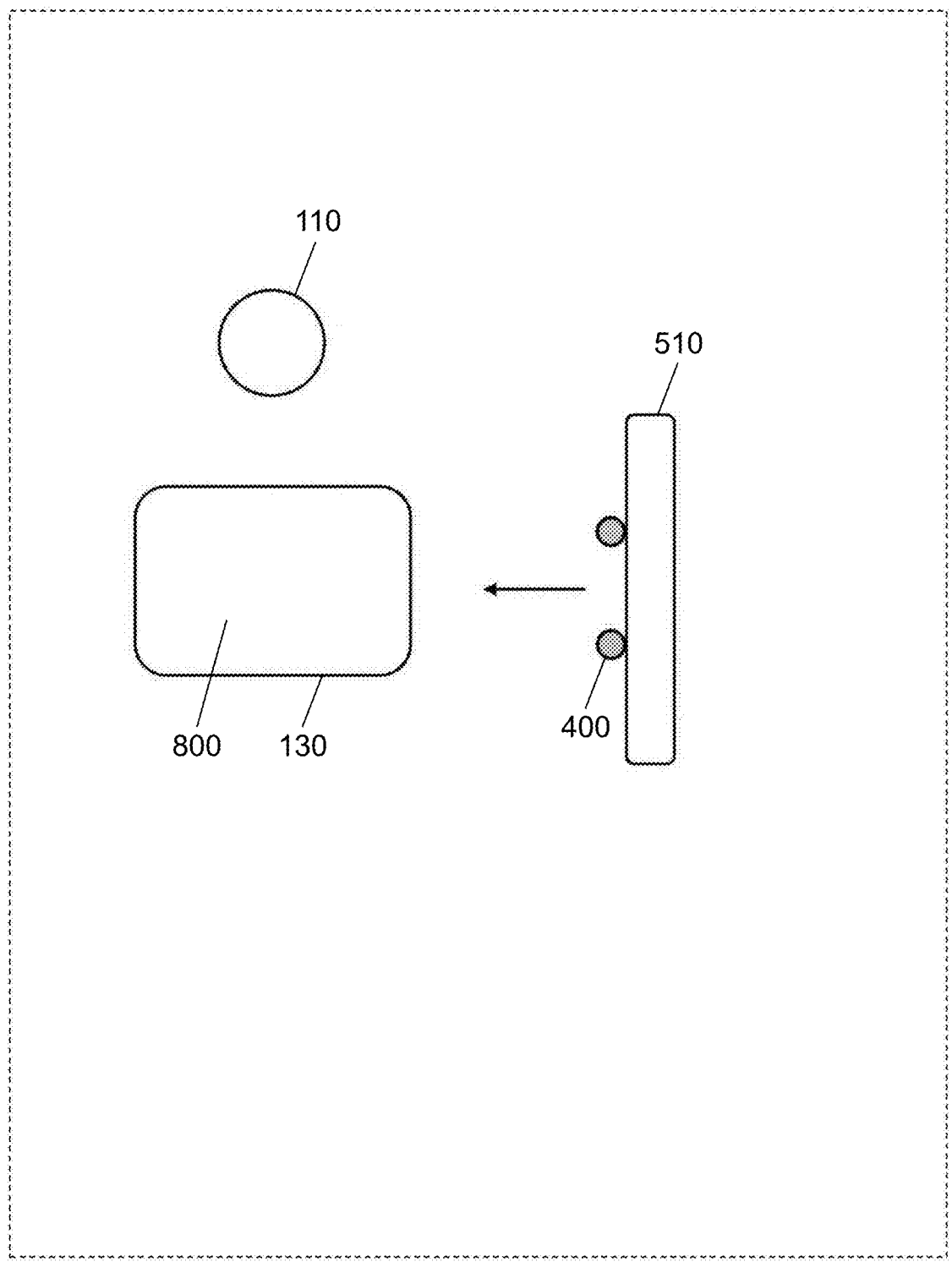
FIG. 16 is a diagram showing an example of a magnetically shielded space according to a sixth exemplary embodiment of the present disclosure.

As shown in FIG. 16, the difference from the first to fifth exemplary embodiments is that metal foreign substance 400 is put into magnetically shielded space 800 by moving member 510.

When power transmission coil 110 is arranged outside power transmission-side cancel coil 130, the magnetic field strength inside power transmission-side cancel coil 130 is weaker than the magnetic field strength outside power transmission-side cancel coil 130. That is, the inside of power transmission-side cancel coil 130 is magnetically shielded space 800. In a sixth exemplary embodiment, as shown in FIG. 16, power transmission-side cancel coil 130 has a rectangular shape having rounded corners, and power transmission coil 110 is formed in a circular shape so as to have a central axis on an outer side in a plane direction of power transmission-side cancel coil 130. However, as long as a magnetically shielded space can be formed inside power transmission-side cancel coil 130, the shapes of power transmission-side cancel coil 130 and power transmission coil 110 are not limited to the shapes shown in FIG. 16.

By putting metal foreign substance 400 into magnetically shielded space 800 by moving member 510, it is possible to suppress heat generation of metal foreign substance 400.

A moving mechanism capable of moving a part or all of the upper surface of a moving member from an area outside a magnetically shielded space to inside the magnetically shielded space may be provided.

As described above, the present disclosure can be applied to applications such as a power transmission device, a power reception device, and a wireless power transmission device that transmit or receive power in a non-contact manner.

What is claimed is:

1. A power transmission device comprising:
a power transmission coil;
a magnetically shielded space created by a power transmission-side cancel coil arranged outside the power transmission coil;
a moving member configured to move a metal foreign substance; and
a moving mechanism configured to move a part or all of an upper surface of the moving member from an area outside the magnetically shielded space into the magnetically shielded space,
wherein the power transmission-side cancel coil includes at least a short-circuited loop coil.

2. The power transmission device according to claim 1, further comprising a housing including the power transmission coil and the power transmission-side cancel coil inside, wherein
the moving member is configured to move the metal foreign substance and allows the metal foreign substance to be placed on top, and is arranged on a surface of the housing, and
the moving mechanism moves a part or all of the upper surface of the moving member into the magnetically shielded space outside the power transmission-side cancel coil.

3. The power transmission device according to claim 2, wherein
the moving mechanism is configured to perform
a movement operation for moving a part or all of the upper surface of the moving member, and
a return operation for returning the moving member to a position before the movement operation is performed, and
the moving mechanism moves a metal foreign substance that has entered a surface of a housing exposed by the movement operation to an outside of the power transmission-side cancel coil by the return operation.

4. The power transmission device according to claim 3, wherein after the metal foreign substance is moved, the metal foreign substance is moved to a storage container.

5. The power transmission device according to claim 2, wherein an end portion of the moving member on a side of the housing being exposed by the movement operation is in contact with the surface of the housing.

6. The power transmission device according to claim 2, wherein a size of the moving member is larger than a size of the power transmission-side cancel coil.

7. The power transmission device according to claim 2, wherein the size of the moving member is larger than a size of the housing.

8. A power transmission device comprising:
a power transmission coil;
a power transmission-side cancel coil that is arranged outside the power transmission coil and generates a magnetic field opposite to a magnetic field generated by the power transmission coil;
a housing provided with the power transmission coil and the power transmission-side cancel coil inside;
an opening provided on a surface of the housing above the power transmission coil;
a moving member that covers the opening and allows a metal foreign substance to be placed on top;
a moving mechanism that moves a part or all of an upper surface of the moving member to an outside of the power transmission-side cancel coil; and
a belt that is arranged in the housing and conveys the metal foreign substance that has entered through the opening to the outside of the power transmission-side cancel coil,
wherein the power transmission-side cancel coil includes at least a short-circuited loop coil.

9. The power transmission device according to claim 8, wherein the belt rotates before the opening is opened by movement of the moving member.

10. The power transmission device according to claim 8, wherein a size of the moving member is larger than a size of the power transmission-side cancel coil.

11. The power transmission device according to claim 8, wherein the size of the moving member is larger than a size of the housing.

12. A method for driving a power transmission device, wherein the power transmission device includes a power transmission-side cancel coil that is arranged outside a power transmission coil, generates a magnetic field opposite to a magnetic field generated by the power transmission coil and includes at least a short-circuited loop coil, a housing including the power transmission coil and the power transmission-side cancel coil inside, and a moving member that is arranged on a surface of the housing and allows a metal foreign substance to be placed on top,
the method comprising moving a part or all of an upper surface of the moving member to an outside of the power transmission-side cancel coil by a moving mechanism.

13. The method for driving a power transmission device according to claim 12, wherein after a part or all of the upper surface of the moving member is moved to the outside of the power transmission-side cancel coil, the moving member is returned, and the metal foreign substance is moved to the outside of the power transmission-side cancel coil on a side opposite to a moving direction of the moving member.

14. A method for driving a power transmission device, wherein the power transmission device includes a power transmission-side cancel coil that is arranged outside a power transmission coil, generates a magnetic field opposite to a magnetic field generated by the power transmission coil and includes at least a short-circuited loop coil, a housing including the power transmission coil and the power transmission-side cancel coil inside, an opening provided on a surface of the housing above the power transmission coil, a moving member that covers the opening and allows a metal foreign substance to be placed on top, and a belt arranged in the housing, the method comprising before or after the moving member opens the opening, conveying the metal foreign substance that has entered through the opening to an outside of the power transmission-side cancel coil.

* * * * *